United States Patent
Meister et al.

(10) Patent No.: US 9,758,250 B2
(45) Date of Patent: Sep. 12, 2017

(54) REMOVABLE ARM REST SHROUD FOR AIRCRAFT SEATING

(71) Applicant: B/E Aerospace, Inc., Wellington, FL (US)

(72) Inventors: Peter C. Meister, Miami, FL (US); Aravinda Mahabaleshwara, Dubasipalya (IN); Mike Romero, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/520,063

(22) Filed: Oct. 21, 2014

(65) Prior Publication Data

US 2015/0108814 A1    Apr. 23, 2015

Related U.S. Application Data

(60) Provisional application No. 61/893,451, filed on Oct. 21, 2013.

(51) Int. Cl.
*B64D 11/06* (2006.01)

(52) U.S. Cl.
CPC ........... *B64D 11/0646* (2014.12); *Y02T 50/46* (2013.01)

(58) Field of Classification Search
CPC ....... B64D 11/06; B64D 11/0646; A47C 7/54; B60N 2/46; B60N 2/466; Y02T 50/46
See application file for complete search history.

(56) References Cited

U.S. PATENT DOCUMENTS

| | | | |
|---|---|---|---|
| 2,802,518 A * | 8/1957 | Liljengren | A47C 1/024 297/411.45 |
| 4,027,916 A | 6/1977 | McElroy | |
| 5,024,486 A | 6/1991 | Auel | |
| 5,352,020 A | 10/1994 | Wade et al. | |
| 5,584,534 A * | 12/1996 | Kuranami | B60N 2/245 297/145 |
| 5,931,535 A * | 8/1999 | Sweet | A47C 1/0345 297/354.13 |
| 6,173,921 B1 * | 1/2001 | Neumann | B64D 11/06 244/118.6 |
| 7,011,273 B1 * | 3/2006 | Stanford | B60N 3/102 224/275 |
| 2011/0043006 A1 | 2/2011 | Butt et al. | |
| 2013/0241256 A1 | 9/2013 | Marini et al. | |

OTHER PUBLICATIONS

International Search Report conducted by the ISA/US for PCT/US2014/061580 Dated Jan. 21, 2015.

* cited by examiner

*Primary Examiner* — Philip Gabler
(74) *Attorney, Agent, or Firm* — Gardella Grace P.A.

(57) ABSTRACT

An aircraft passenger seat having a seat bottom, a seat back, and right and left armrests. The arm rests include structural arm rest assemblies for attachment to the seat bottom, and arm rests for being removably-positioned on the structural arm rest panels. Upholstery shrouds are adapted for being positioned on and covering the right and left arm rests. The shrouds are easily removed and installed as needed.

7 Claims, 7 Drawing Sheets

REMOVABLE ARM REST SHROUD FOR AIRCRAFT SEATING

CROSS REFERENCE TO RELATED PATENT APPLICATION

This application claims priority to and benefit from U.S. Provisional Patent Application No. 61/893,451, filed Oct. 21, 2013, the contents of which are expressly incorporated herein by reference.

TECHNICAL FIELD AND BACKGROUND OF THE INVENTION

The present invention relates to a removable arm rest shroud for aircraft passenger seats.

Seating arm rest boxes are typically manufactured from either a Comex panel, aluminum honeycomb, or machined aluminum for aircraft applications. The invention of this application allows for a panel and support structure to be attached to the aircraft seat frame. A box-like structure, i.e., a "shroud", is then inserted over the top, covering the structural arm rest, and having connection points that snap, click, or fit into place while attaching it permanently with a screw at some location below the seat cushion mark. This structure allows the upholstery of the arm rest shroud to be structurally separate from the seat upholstery of the seat bottom, seat back and head rest. This can reduce the amount of time and the complexity presently required to upholster a complete seat.

Designing, manufacturing, and assembling the seat in this manner allow the upholstery of the arm rest shroud to be a separate, removable component. In addition, the separately movable shroud allows for repairs to be made after the seat has been delivered and installed without removing the seat from the aircraft.

SUMMARY OF THE INVENTION

It is therefore an object of the present invention to provide an aircraft seat manufactured such that an internal arm rest structure is attached to a seat frame which provides structural integrity of the arm rest.

It is another object of the invention to provide an aircraft seat with an arm rest shroud that has an inside panel, outside panel, top panel, forward panel, and rear panel forming a box with an open bottom.

It is another object of the invention to provide an aircraft seat with an arm rest shroud that has an open bottom that allows the shroud to be slipped over the structural panel and attached to the structural arm rest.

It is another object of the invention to provide an aircraft seat with an arm rest shroud that is simple to remove, in that the shroud can lift up over the structural arm rest and be upholstered and then installed back onto the structural arm rest in the same manner.

According to one preferred embodiment of the invention, a seat having a seat bottom, a seat back, a head rest and a leg rest is mounted on a seat frame, and includes a right hand arm rest panel and a left hand arm rest panel mounted to respective right and left hand sides of the seat frame, and a right hand arm rest assembly positioned over the right hand arm rest panel. A left hand arm rest assembly is positioned over the left hand arm rest panel. The right hand arm rest assembly and the left hand arm rest assembly include an upholstered surface.

According to another embodiment of invention, the right hand arm rest assembly and the left hand arm rest assembly each include an outer shroud and an inner arm rest support that are nested together to form a hollow structure that fits over respective right hand arm rest panel and left hand arm rest panel.

According to another embodiment of invention, the seat frame includes a pair of outwardly-extending right hand arm rest braces and a pair of outwardly extending left hand arm rest braces, and the right hand inner arm rest support and the left hand inner arm rest support each have attachment members adapted to cooperate with the respective arm rest braces to mount the right hand arm rest panel and left hand arm rest panel.

According to another embodiment of invention, the right hand and left hand arm rest braces are vertically-oriented, and the attachment members have cut-outs in the right hand arm rest panel and left hand arm rest panel that are adapted to fit over and be supported by the respective right hand and left hand arm rest braces.

According to another embodiment of invention, the right hand arm rest panel and the left hand arm rest panel each include a support plate positioned on an upper extent to support the respective a right hand arm rest assembly and left hand arm rest assembly.

According to another embodiment of invention, a seat is provided having a seat bottom, a seat back, a head rest and a leg rest mounted on a seat frame, and includes a right hand arm rest panel and a left hand arm rest panel mounted to respective right and left hand sides of the seat frame. A right hand arm rest assembly is positioned over the right hand arm rest panel, and a left hand arm rest assembly is positioned over the left hand arm rest panel. The right hand arm rest assembly and the left hand arm rest assembly includes an upholstered surface. The right hand arm rest assembly and the left hand arm rest assembly are each provided with an outer shroud and an inner arm rest support that are nested together to form a hollow structure that fits over respective right hand arm rest panel and left hand arm rest panel. The seat frame includes a pair of outwardly-extending right hand arm rest braces and a pair of outwardly extending left hand arm rest braces. The right hand inner arm rest support and the left hand inner arm rest support each have attachment members adapted to cooperate with the respective arm rest braces to mount the right hand arm rest panel and left hand arm rest panel. The right hand and left hand arm rest braces are vertically-oriented, and the attachment members include cut-outs in the right hand arm rest panel and left hand arm rest panel that are adapted to fit over and be supported by the respective right hand and left hand arm rest braces.

According to another embodiment of invention, the right hand arm rest panel and the left hand arm rest panel each include a support plate positioned on an upper extent to support the respective a right hand arm rest assembly and left hand arm rest assembly.

According to another embodiment of invention, a method of providing arm rests for passenger seats that are removable for repair or replacement is provided, and includes the steps of providing a seat that includes a seat bottom, a seat back, a head rest and a leg rest mounted on a seat frame, a right hand arm rest panel and a left hand arm rest panel mounted to respective right and left hand sides of the seat frame, a right hand arm rest assembly positioned over the right hand arm rest panel, and a left hand arm rest assembly positioned over the left hand arm rest panel. The right hand arm rest assembly and the left hand arm rest assembly include an upholstered surface. The right hand arm rest assembly and the left hand arm rest assembly each include an outer shroud and an inner arm rest support that are nested together to form a hollow structure. The method steps also include providing an upholstery cover for the outer shrouds, and installing the right hand arm rest assembly and the left hand arm rest assembly over the respective right hand arm rest panel and left hand arm rest panel.

According to another embodiment of invention, the seat frame includes a plurality of outwardly-extending right hand arm rest braces and a plurality of outwardly extending left hand arm rest braces, and the right hand inner arm rest support and the left hand inner arm rest support each have attachment members adapted to cooperate with the respective arm rest braces to mount the right hand arm rest panel and left hand arm rest panel.

According to another embodiment of invention, the right hand and left hand arm rest braces are vertically-oriented, and the attachment members have cut-outs in the right hand arm rest panel and left hand arm rest panel that are adapted to fit over and be supported by the respective right hand and left hand arm rest braces.

According to another embodiment of invention, the right hand arm rest panel and the left hand arm rest panel each include a support plate positioned on an upper extent to support the respective a right hand arm rest assembly and left hand arm rest assembly.

According to another embodiment of invention, the method includes the step of removing the right hand arm rest assembly and left hand arm rest assembly from the respective right hand arm rest panel and the left hand arm rest panel by lifting the right hand arm rest assembly and left hand arm rest assembly vertically upwardly from the respective right hand arm rest panel and the left hand arm rest panel.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
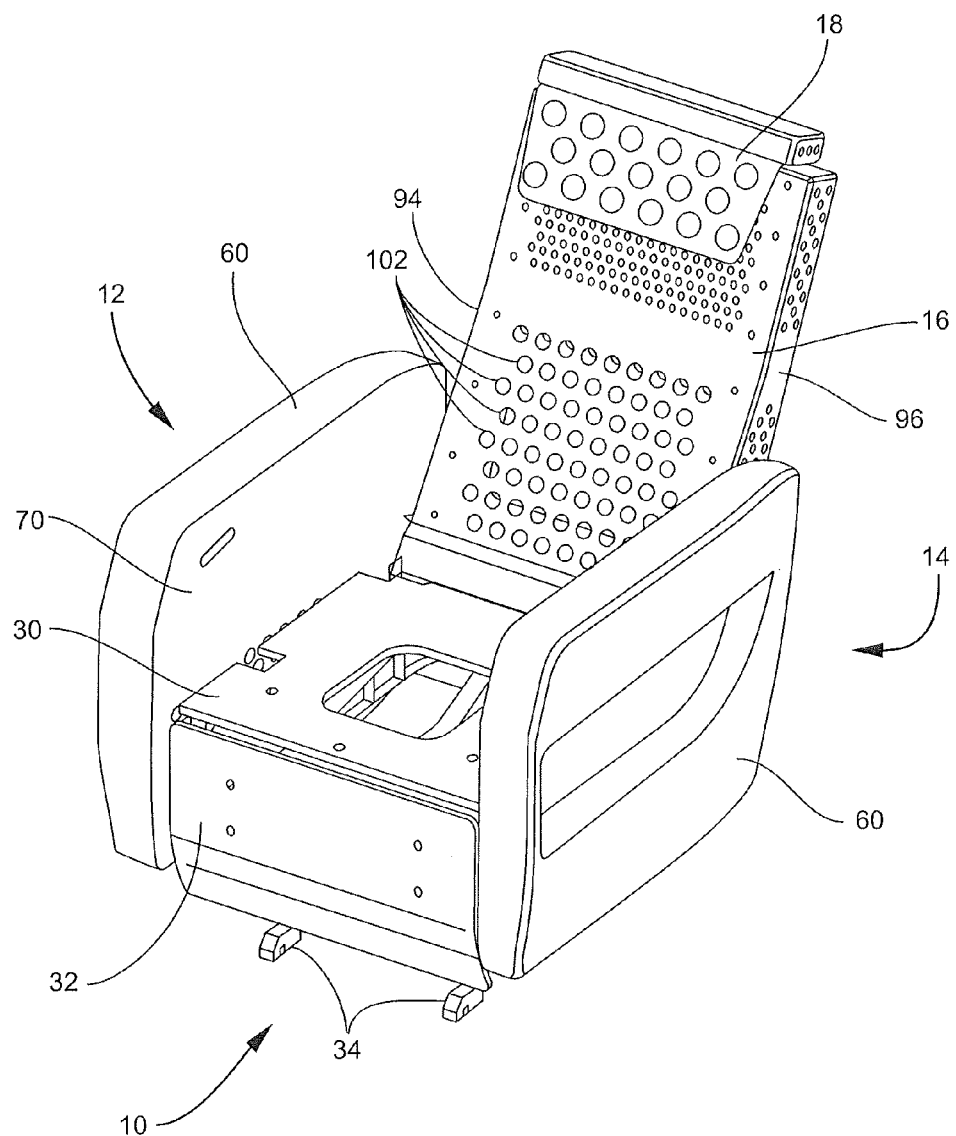
FIG. 1 is a perspective view of a seat according to an embodiment of the invention.
Figure 2:
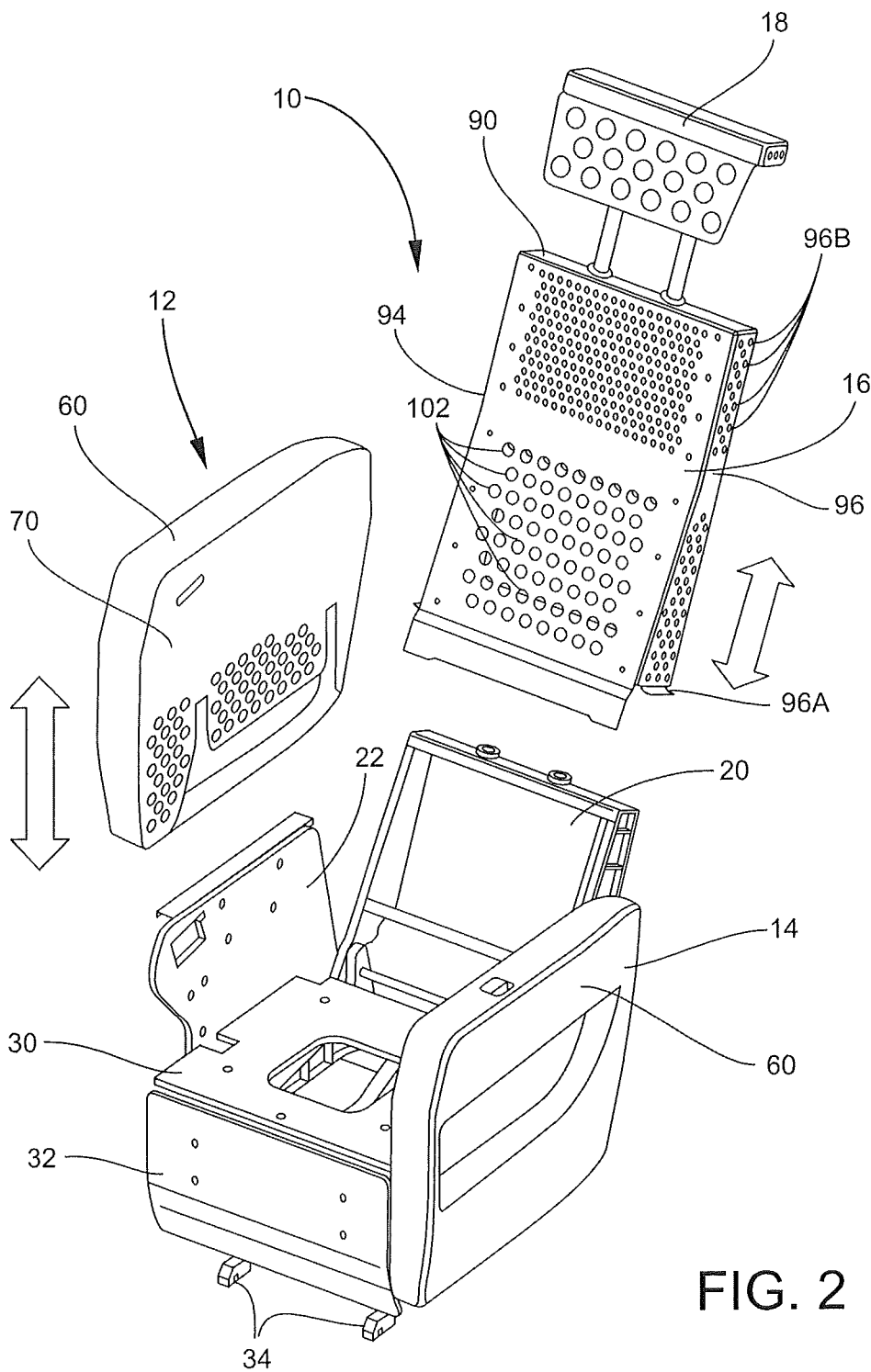
FIG. 2 is an exploded view of the seat shown in FIG. 1, showing the arm rest shell assembly attachment to the arm rest panel assembly.
Figure 6:
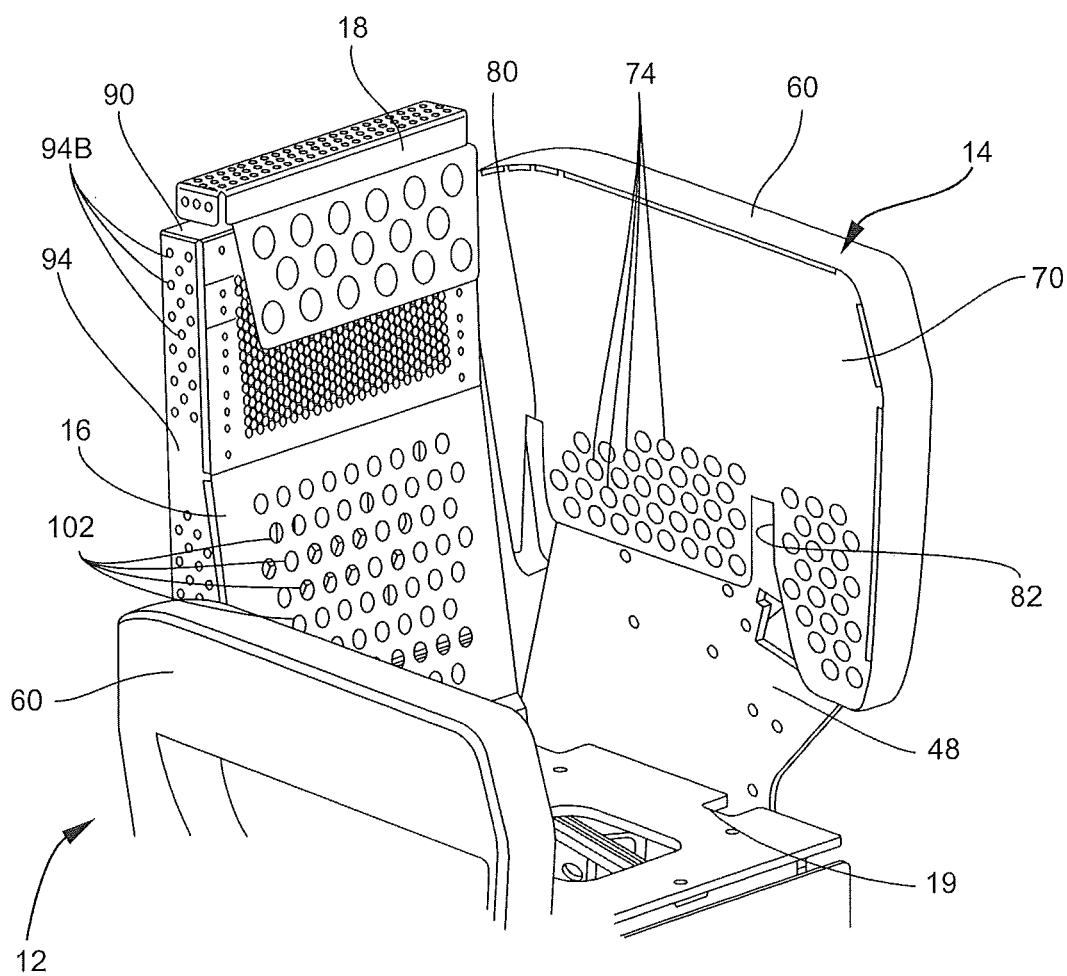
FIG. 6 is a perspective view showing installation of the left hand arm rest shell and shroud over the arm rest panel.
Figure 7:
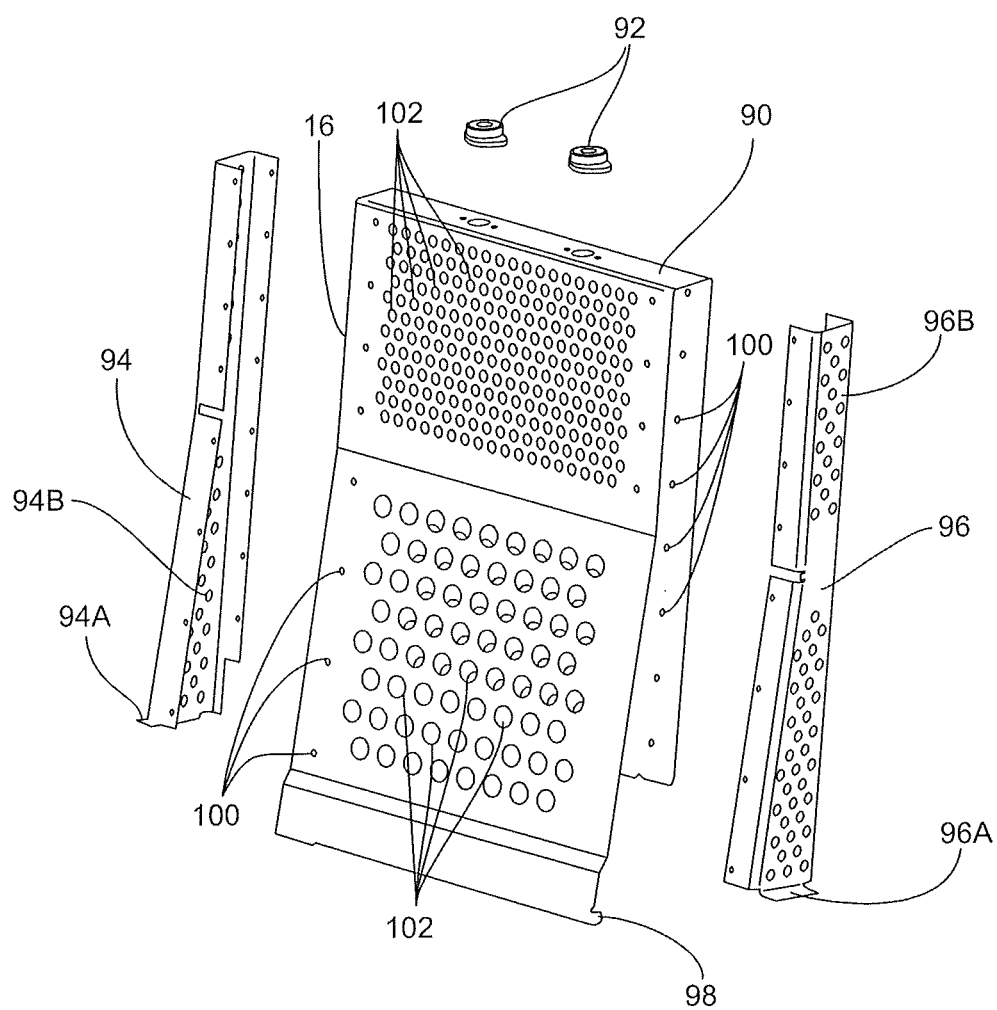
FIG. 7 is a partial, exploded perspective view showing the back rest shell assembly.

Referring now specifically to the drawings, a seat 10 according to an embodiment of the present invention is shown in FIGS. 1 and 2, and includes right hand and left hand arm rest assemblies 12 and 14, a back rest assembly 16, a head rest assembly 18, and a back rest beam 20. As shown in FIG. 2, the head rest assembly 18 mounts to the top of the back rest assembly 16, and the back rest assembly 16 is positioned over the back rest beam 20. The right hand arm rest assembly 12 slides down over a right hand arm rest panel 22. In the same manner, the left hand arm rest assembly 14 slides downwardly over a left hand arm rest panel 48, as best shown in FIG. 6.

Seat 10 also includes a seat pan 30 and a leg rest 32 mounted for selective movement between a retracted position, as shown, and an outward and upwardly-extended deployed use position. The seat 10 includes legs 34 adapted with feet for being attached to track fittings mounted into the deck of the aircraft.

Figure 3:
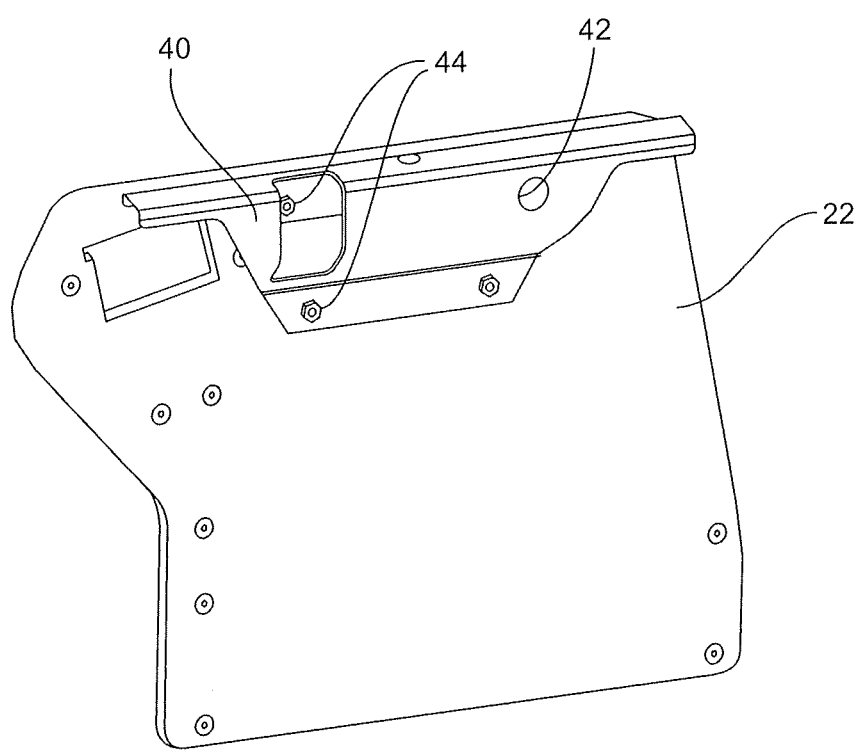
FIG. 3 is a perspective view of an arm rest panel according to an embodiment of the invention.

Referring now to FIG. 3, the right hand arm rest panel 22 includes an arm rest support plate 40 that is located at the top end of the right hand arm rest panel 22 and extends laterally inwardly to provide weight-bearing support. The arm rest panel 22 is fabricated of a flame-resistant meta-aramid material, such as sold by DuPont under the registered trademark Comex. The arm rest panel 22 includes appropriate access holes 42 to receive fasteners, such as fasteners 44.

Figure 4:
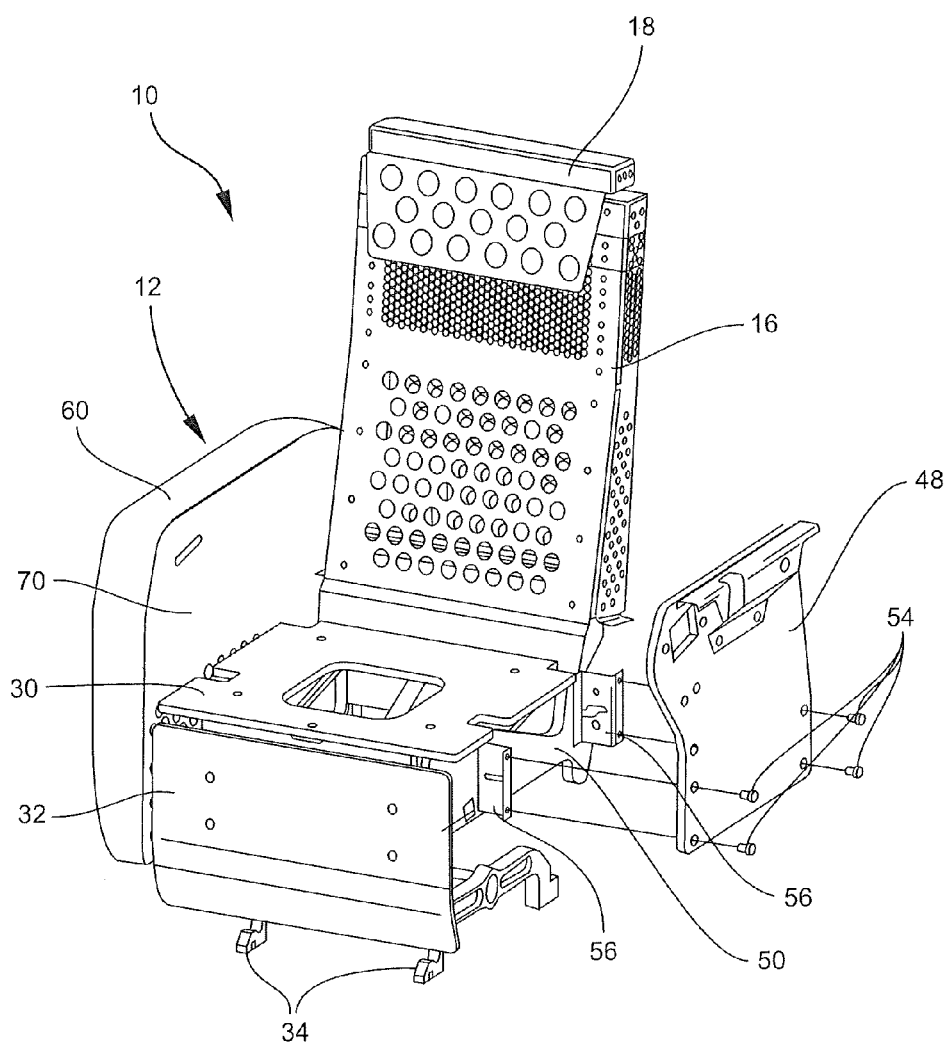
FIG. 4 is a perspective view of the seat showing attachment of the arm rest panel to the seat structure.
Figure 5:
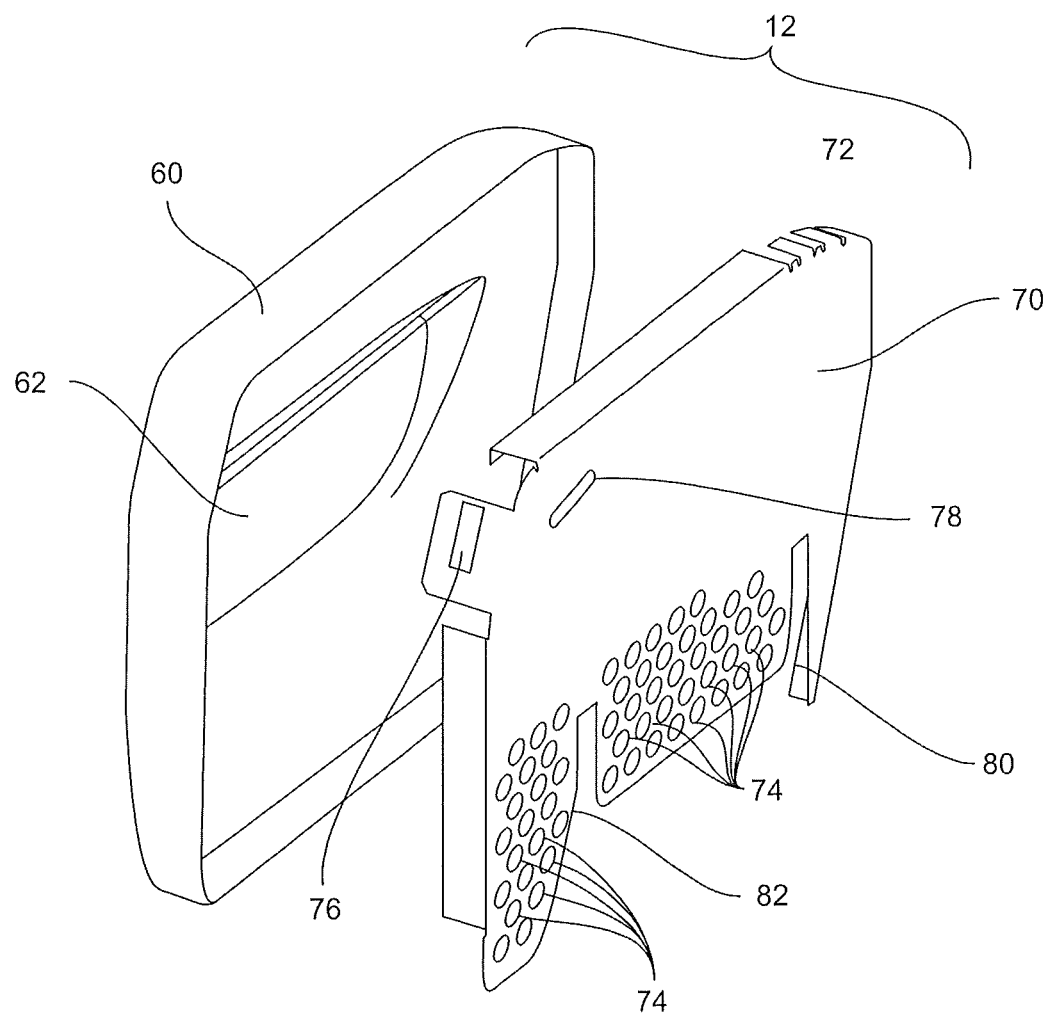
FIG. 5 is a perspective view showing the right hand side arm rest shell assembly and arm rest shroud before assembly.

As shown in FIG. 4, the left hand arm rest panel 48 is mounted to seat frame 50 by attachment with fasteners 54 to arm rest braces 56 carried by the seat frame 50. The right hand arm rest panel 22 is mounted to the seat frame 50 in the same manner. See FIG. 2.

Referring now to FIGS. 2 and 6, the arm rest assembly 12 is formed from a shroud 60 and an arm rest support 70. The shroud 60 includes a pocket 62 for providing the seat occupant with a place to store a mobile phone or other electronics, magazines or small clothing or other personal items. The aim rest support 70 is attached to the arm rest panel 22. A flange 72 on the top of the arm rest support 70 supports the top of the arm rest shroud 60. Holes 74 are formed to provide weight reduction, and an opening 76 on the forward end of the arm rest support 70 permits installation of the seat controls. An opening 78 permits installation of push buttons to activate the seat pan 30, leg rest 32 and back rest 16 recline mechanisms. Tapered cut-outs 80, 82 at the bottom of the arm rest support 70 are provided for ease of installation of the shroud 60 over the arm rest support 70.

After the right and left hand arm rest panels 22 and 48 have been mounted on the frame 50, and the right and left hand arm rest assemblies 12 and 14 have been assembled as illustrated, the right hand arm rest assembly 12, which includes the shroud 60, is mounted onto the right hand arm rest support 70, as shown in FIG. 6. The right hand arm rest assembly 12 is shown already in its use position, and the left arm rest panel assembly 14 is shown as it is being lowered onto the left hand arm rest panel 48.

The back rest assembly 16 includes a back rest cover 90, and head rest guide and bezel 92, together with right hand and left hand back rest frames 94 and 96. Holes 98 are used to assemble with the back rest beam 20, which is part of the seat frame 50. The back rest assembly 16 also includes rivet holes 100, weight reduction holes 102. The back rest frames 94 and 96 include flanges 94A, 96A on which upholstery is mounted. Weight reduction holes 94B, 96B, respectively, are also provided in the back rest frames 94 and 96. In the same manner described above, a removable shroud, not shown, may be provided for being positioned over the seat back for removal, repair or replacement as required.

A removable arm rest shroud for aircraft seating according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A seat having a seat bottom, a seat back, a head rest and a leg rest mounted on a seat frame, comprising:
   (a) a right hand arm rest panel and a left hand arm rest panel fixed to respective right and left hand sides of the seat frame with braces, each of the right and left hand arm rest panels comprising a support plate located at a top end thereof that extends laterally inward in a direction of the seat bottom, and each of the right hand arm rest panel and the left hand arm rest panel shaped as a flat plate spanning continuously a length of the seat bottom forward of the seat back and extending above a height of the seat bottom;
   (b) a right hand arm rest assembly positioned over the right hand arm rest panel, and a left hand arm rest assembly positioned over the left hand arm rest panel, each of the right and left hand arm rest assemblies fitting over and covering opposite sides of their respective arm rest panel and having tapered cut-outs at a bottom end of an inner side thereof for receiving the braces therein; and
   (c) the right hand arm rest assembly and the left hand arm rest assembly including an upholstered surface.

2. A seat according to claim 1, wherein the right hand arm rest assembly and the left hand arm rest assembly are each comprised of an outer shroud and an inner arm rest support that are nested together to form a hollow structure that fits over the respective right hand arm rest panel and left hand arm rest panel.

3. A seat according to claim 1, wherein the braces extend outward from the seat and are vertically-oriented, and the cut-outs in the right hand arm rest panel and the left hand arm rest panel comprise a tapered opening leading into an elongate vertical slot.

4. A seat according to claim 1, further comprising a back rest cover that fits over and attaches to an underlying back rest beam.

5. A seat having a seat bottom, a seat back, a head rest and a leg rest mounted on a seat frame, comprising:
   (a) a right hand arm rest panel and a left hand arm rest panel fixed to respective right and left hand sides of the seat frame with vertically-oriented braces, each of the right hand arm rest panel and the left hand arm rest panel shaped as a flat plate spanning continuously a length of the seat bottom forward of the seat back and extending above a height of the seat bottom;
   (b) a right hand arm rest assembly positioned over the right hand arm rest panel, and a left hand arm rest assembly positioned over the left hand arm rest panel;
   (c) the right hand arm rest assembly and the left hand arm rest assembly each including an upholstered surface;
   (d) wherein the right hand arm rest assembly and the left hand arm rest assembly are each comprised of an outer shroud and an inner arm rest support that are nested together to form a hollow structure that fits over the respective right hand arm rest panel and the left hand arm rest panel such that opposing sides of the right and left hand arm rest panels are covered; and
   (e) the inner arm rest support of each of the right and left hand arm rest assemblies having cut-outs at a bottom end thereof receiving the vertically oriented braces therein when the right and left hand arm rest assemblies are installed over the respective right and left hand arm rest panels.

6. A seat according to claim 5, wherein the right hand arm rest panel and the left hand arm rest panel each include a support plate positioned on an upper extent thereof to support the respective right hand arm rest assembly and the left hand arm rest assembly.

7. A seat according to claim 5, further comprising a back rest cover that fits over and attaches to an underlying back rest beam.

* * * * *